United States Patent [19]

Suzuki

[11] Patent Number: 5,742,582
[45] Date of Patent: Apr. 21, 1998

[54] DISK MEDIUM AND METHOD OF WRITING DATA ONTO THE DISK MEDIUM

[75] Inventor: Katsuji Suzuki, Fukushima-ken, Japan

[73] Assignee: Alps Electric Co., Ltd., Tokyo, Japan

[21] Appl. No.: 924,967

[22] Filed: Sep. 8, 1997

Related U.S. Application Data

[63] Continuation of Ser. No. 574,529, Dec. 19, 1995, abandoned.

[30] Foreign Application Priority Data

Jan. 26, 1995 [JP] Japan ................... 7-010788

[51] Int. Cl.⁶ ........................................... G11B 7/24
[52] U.S. Cl. .......................... 369/275.1; 369/275.3
[58] Field of Search ................. 369/275.1, 275.2, 369/275.3, 13, 32, 47, 48, 58, 59, 54, 49, 44.34, 44.25, 44.26, 109, 111; 360/51, 48, 77.08

[56] References Cited

U.S. PATENT DOCUMENTS

| 5,148,422 | 9/1992 | Sako et al. ................ 369/44.26 |
|---|---|---|
| 5,210,660 | 5/1993 | Hetzler ........................ 360/51 |
| 5,255,261 | 10/1993 | Iida et al. .................. 369/275.3 |
| 5,388,090 | 2/1995 | Hoshino et al. ............ 369/275.3 |
| 5,446,724 | 8/1995 | Tabe et al. ................. 369/275.1 |

*Primary Examiner*—Ali Neyzari
*Attorney, Agent, or Firm*—Guy W. Shoup

[57] ABSTRACT

A invention relates to a disk medium and a method of writing data onto the disk medium. The disk medium is formatted in such a manner that: there are provided a plurality of track zones formed into segments of concentric circles separated from each other in radial directions of the disk; a plurality of servo areas are formed along lines which are located at intervals of substantially equal angle and which extend from the center of the disk toward the outer periphery across the track zones; the plurality of track zones each include a plurality of sector areas each provided with a data area; and the length (in bytes) of the data area in each sector area is varied depending on the track zone's location on the disk medium so that no servo area is located within any of data areas.

5 Claims, 4 Drawing Sheets

| TRACK ZONE NO. | 1 | 2 | 3 | 4 | 5 | 6 |
|---|---|---|---|---|---|---|
| SECTOR SIZE (BYTE) | 256 | 244 | 228 | 192 | 160 | 128 |

DISK MEDIUM AND METHOD OF WRITING DATA ONTO THE DISK MEDIUM

This application is a continuation of application Ser. No. 08/574,529, filed Dec. 19, 1995 now abandoned.

BACKGROUND OF THE INVENTION

1. Field of the Invention

The present invention relates to a disk medium and a method of writing data onto the disk medium. More particularly, the present invention relates to a disk medium formatted in such a manner that the length (in bytes) of each data area of the disk medium is varied so that no servo area is located within any data area, and also to a method of writing data onto such the disk medium.

2. Description of the Related Arts

In conventional disk media for use in magnetic disk devices, there are provided a plurality of track zones each including a plurality of tracks formed into segments of concentric circles separated from each other in radial directions of the disk, and a plurality of servo areas are formed along lines which are located at intervals of substantially equal angle and which extend from the center of the disk toward the outer periphery across the above track zones wherein each track zone includes a plurality of sector areas each including an identification (ID) area and a data area. In the conventional disk media of this type, each data area has a predetermined fixed size, for example 256 bytes.

FIG. 3 is a schematic representation of an example of a disk medium formatted according to the conventional technique, for use in a conventional magnetic disk device.

As shown in FIG. 3, the disk medium 31 has a plurality of, six in the case of this example, track zones $32_{1T}$, $32_{2T}$, $32_{3T}$, ..., $32_{6T}$ which are formed into segments of concentric circles separated from each other in radial directions of the disk. Each track zone $32_{1T}$ to $32_{6T}$ includes a plurality of tracks formed into segments of concentric circles.

Furthermore, a plurality of, eight in the case of this example, servo areas $34_{1s}$, $34_{2s}$, $34_{3s}$, ..., $34_{8s}$ are formed along lines which are located at intervals of substantially equal angle and which extend from the center 33 of the disk toward the outer periphery across the six track zones $32_{1T}$, $32_{2T}$, $32_{3T}$, ..., $32_{6T}$. The track zone $32_1$ is divided into a first sector area $35_{1c}$, a second sector area $35_{2c}$, a third sector area $35_{3c}$, ..., a thirteenth sector area $35_{13c}$. The track zone $32_{2T}$ is divided into a first sector area $36_{1c}$, a second sector area $36_{2c}$, a third sector area $36_{3c}$, ..., an eleventh sector area $36_{11c}$. The track zone $32_{3T}$ is divided into a first sector area $37_{1c}$, a second sector area $37_{2c}$, a third sector area $37_{3c}$, ..., a ninth sector area $37_{9c}$. The track zone $32_{4T}$ is divided into a first sector area $38_{1c}$, a second sector area $38_{2c}$, a third sector area $38_{3c}$, ..., an eighth sector area $38_{8c}$. Similarly, the track zone $32_{5T}$ is divided into a first sector area $39_{1c}$, a second sector area $39_{2c}$, a third sector area $39_{3c}$, ..., a sixth sector area $39_{6c}$, and the track zone $32_{6T}$ is divided into a first sector area $40_{1c}$, a second sector area $40_{2c}$, a third sector area $40_{3c}$, a fourth sector area $40_{4c}$. In this technique, the number of sector areas formed in the six track zones $32_{1T}$ to $32_{6s}$ has a maximum value of 13 in the track zone $32_{1T}$, and a minimum value of 4 in the track zone $32_{6T}$. The Other track zones $32_{2T}$ to $32_{5T}$ have for example 9, 8, 6, and 4 sector areas, respectively, in which the number of the sector areas contained in the track zones at outer locations of the disk is greater than those at inner locations.

In the technique described above, the size of each sector area $35_{1c}$ to $35_{13c}$, $36_{1c}$ to $36_{11c}$, $37_{1c}$ to $37_{9c}$, $38_{1c}$ to $38_{8c}$, $39_{1c}$ to $39_{6c}$, and $40_{1c}$ to $40_{4c}$ is set to a predetermined fixed length, for example 256 bytes. Therefore, if the track zone $32_{1T}$ at the outermost location of the disk is formed in such manner that the first sector area $35_{1c}$ starts at the location of the servo area $34_{1s}$, the data area of the first sector area $35_{1c}$ ends before it reaches the next servo area $34_{2s}$. As a result, the following second sector area $35_{2c}$ will be located across the servo area $34_{2s}$ and thus the data area of the second sector $35_{2c}$ will be divided into two parts. On the other hand, if the track zone $32_{6s}$ at the innermost location of the disk is formed in such manner that the first sector area $40_{1c}$ starts at the location of the servo area $34_{1s}$ as in the track zone $32_{1T}$, the data area of the first sector area will be located across the next servo area $34_{2s}$. Thus, the data area is divided into two parts by the servo area $34_{2s}$.

FIG. 4 illustrates the detail of a very small part of a sector area of the disk medium for use in a conventional magnetic disk device wherein the disk medium is formatted according to the known technique.

As shown in FIG. 4, in one track zone for example in the track zone $32_{3T}$, one sector area for example the third sector area $37_{3c}$ has a data area which is divided into two data areas a and b by an ID area and the servo area $34_{3s}$. The fourth sector area $37_{4c}$ following the third sector area is also divided into data areas a and b by an ID area and the servo area $34_{4s}$. Similarly, the fifth sector area $37_{5c}$ following that is divided into two data areas a and b by an ID area and the servo area $34_{5s}$.

The detailed structure of one sector area, for example the third sector area $37_{3c}$, is as follows. As shown in FIG. 4, the ID area includes an ID synchronization part (IDSYNC), an ID address mark part (IDAM), a cylinder information part (Cyl), a head information part (Head), a sector information part (Sector), a data split information part (Split), and a CR check part (CRC). The data area a includes a data synchronization part (DataSYNC), a data address mark part (DataAM), and a data area a, while the data area b includes a data synchronization part (DataSYNC), a data address mark part (DataAM), a data area b, and an ECC part (ECC). A gap is formed between the ID area and the data area a, between the data area a and the servo area $34_{2s}$, and also between the servo area $34_{2s}$ and the data area b.

In the conventional disk medium formatted in the above-described manner, as the track zone is located at a more outer position of a disk, the area between one servo area and the adjacent servo area becomes wider and thus the area in which data is written becomes wider. In contrast, each sector area consisting of an ID area and a data area has a fixed size, and thus if the recording density of the disk medium is maintained constant, data areas of many sector areas are divided by servo areas into two data areas, that is, a data area a and a data area b, as shown in FIG. 4. In the case where one data area is divided into two areas, data area a and data area b, it is required not only to form a gap between the data area a and the servo area, and between the servo area and the data area b, but also to form a data split information part (Split), two data synchronization parts (DataSYNC), and two data address marks (DataAM), as shown in FIG. 4. Another problem of the conventional technique is that each track zone includes a useless area (denoted by the shaded areas in FIG. 3) between the first sector area and the last sector area wherein no data is written in such the area.

If a data area is divided into two parts, data area a and data area b, then hardware and/or software are required to handle each divided data and thus a magnetic disk device has to perform complicated control associated with the operation of the disk medium.

In the conventional disk medium described above, as described above, a gap is formed between an ID area and a data area a to ensure that after reading (writing) data from (into) the ID area, data can be written onto the data area without encountering problems. If such a gap is simply removed, it becomes difficult to write data into a data area immediately after completion of reading data from an ID area, and thus it becomes difficult to make smooth transition from an operation of reading data from an ID area to an operation of writing data into a data area.

SUMMARY OF THE INVENTION

It is an object of the present invention to solve the above problems. More specifically, it is an object of the present invention to provide a disk medium formatted in such a manner as to minimize useless areas in track zones and to simplify the structure of ID areas and data areas.

It is another object of the present invention to provide a method of writing data onto a disk medium, capable of efficiently writing data into a desired sector area even if no gap is provided between an ID area and a data area.

To achieve the above objects, according to a first aspect of the present invention, there is provided a disk medium formatted in such a manner that the length (in bytes) of the data area of each sector area varies, and thus the size of each sector area varies, depending on the track zone's location on the disk so that data areas are not divided by a servo area and thus track zones have no useless areas in which no data is written thereby ensuring that each area of the disk can be used more efficiently.

According to a second aspect of the present invention, there is provided a disk medium based on the above-described first aspect, in which there is no a gap area between an ID area and a data area a. Since data areas are not split, it becomes unnecessary to form a gap between a data area a and a servo area and between the servo area and a data area b. Furthermore, it becomes unnecessary to form a data split information part (Split), two data synchronization parts (DataSYNC), and two data address mark parts (DataAM) and thus it is possible to expand ID areas and data areas. As a result, a greater amount of data can be written in these areas. In this technique, since data split information parts (Split), data synchronization parts (DataSYNC), and data address mark parts (DataAM) are not required, neither hardware nor software for handling the split data is required, and thus the magnetic disk device can control the operation associated with the disk medium using a simple mechanism.

According to a third aspect of the present invention, there is provided a method of writing data into a data area of a desired sector of the disk medium obtained with the above-described second aspect of the invention, the sector area immediately before the desired sector area is searched for, and the address of that sector area is read. Then, the data is written into the data area of the desired sector area. This technique allows data to be efficiently written into a desired sector area even if no gap is provided between an ID area and a data area.

DESCRIPTION OF THE PREFERRED EMBODIMENTS

Embodiments of the present invention will now be described in detail with reference to the accompanying drawings.

Figures 1A, 1B:
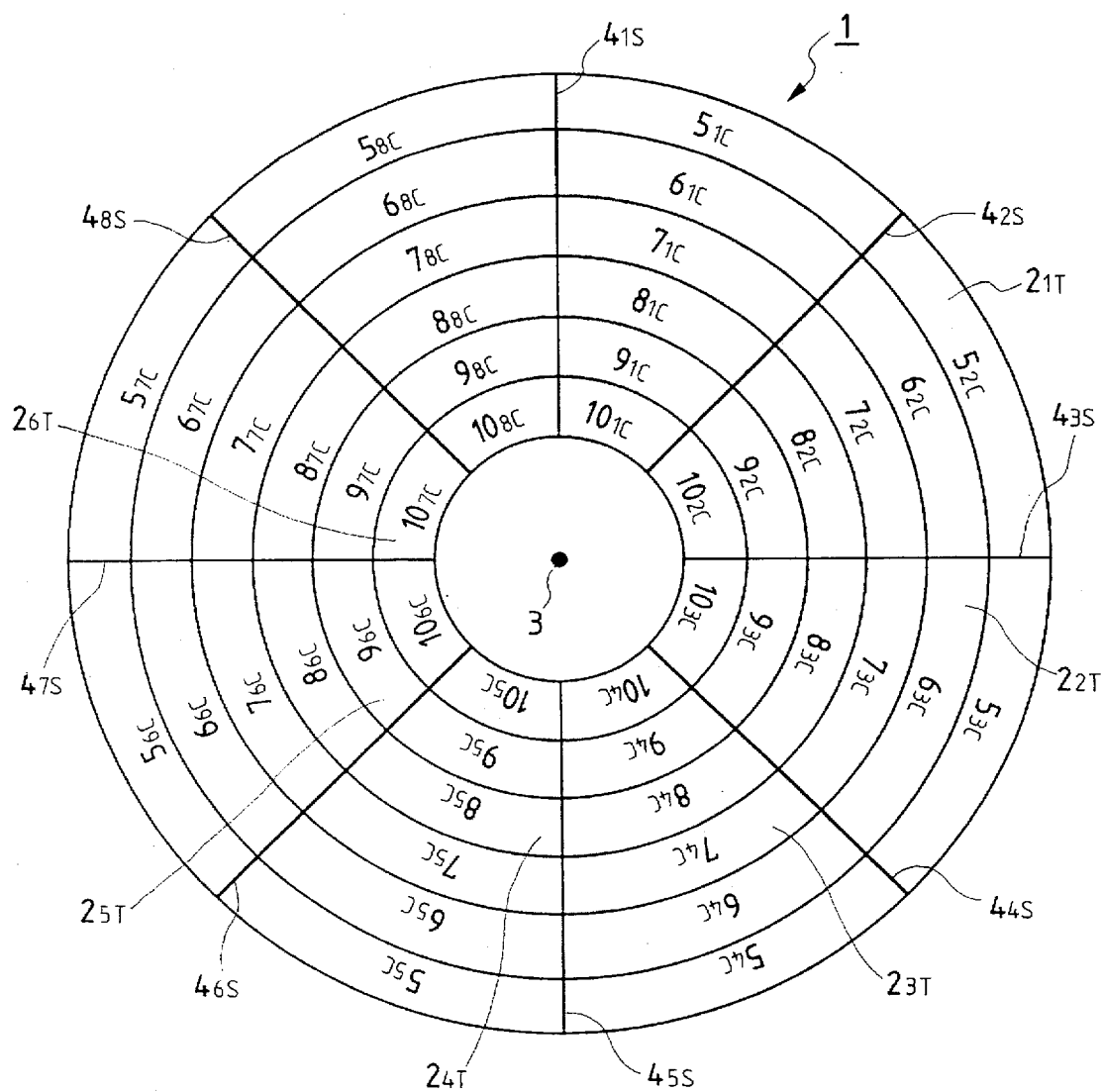
FIGS. 1A and 1B are schematic diagrams illustrating a disk medium formatted according to an embodiment of the present invention, and also illustrating the size of the sector area of each track zone formed in the disk medium.

FIG. 1A is a schematic diagram of an embodiment of a disk medium formatted according to the present invention, and FIG. 1B is a schematic diagram illustrating the size of the sector area of each track zone formed in the disk medium shown in FIG. 1A.

As shown in FIG. 1A, the disk medium 1 has a plurality of, six in the case of the present embodiment, track zones $2_{1T}, 2_{2T}, 2_{3T}, \ldots, 2_{6T}$ which are formed into segments of concentric circles separated from each other in radial directions of the disk. Each track zone $2_{1T}$ to $2_{6T}$ includes a plurality of tracks formed into segments of concentric circles. Furthermore, a plurality of, eight in the case of the present embodiment, servo areas $4_{1s}, 4_{2s}, 4_{3s}, 4_{4s}, 4_{5s}, 4_{6s}, 4_{7s}, 4_{8s}$ are formed along lines which are located at intervals of substantially equal angle and which extend from the center 3 of the disk toward the outer periphery across the six track zones $2_{1T}$ to $2_{6T}$. In the track zone $2_{1T}$, the first sector area $5_{1c}$ is formed between two servo areas $4_{1s}$ and $4_{2s}$, the second sector area $5_{2c}$ is formed between two servo areas $4_{2s}$ and $4_{3s}$, the third sector area $5_{3c}$ is formed between two servo areas $4_{3s}$ and $4_{4s}$, the fourth sector area $5_{4c}$ is formed between two servo areas $4_{4s}$ and $4_{5s}$, the fifth sector area $5_{5c}$ is formed between two servo areas $4_{5s}$ and $4_{6s}$, the sixth sector area $5_{6c}$ is formed between two servo areas $4_{6s}$ and $4_{7s}$, the seventh sector area $5_{7c}$ is formed between two servo areas $4_{7s}$ and $4_{8s}$, and the eighth sector area $5_{8c}$ is formed between two servo areas $4_{8s}$ and $4_{1s}$. In the track zones $2_{2T}$ to $2_{6T}$, as in the track zone $2_{1T}$, the first sector areas $6_{1c}, 7_{1c}, 8_{1c}, 9_{1c}$, and $10_{1c}$ are formed between two servo areas $4_{1s}$ and $4_{2s}$, the second sector areas $6_{2c}, 7_{2c}, 8_{2c}, 9_{2c}$, and $10_{2c}$ are formed between two servo areas $4_{2s}$ and $4_{3s}$, the third sector areas $6_{3c}, 7_{3c}, 8_{3c}, 9_{3c}$, and $10_{3c}$ are formed between two servo areas $4_{3s}$ and $4_{4s}$, the fourth sector areas $6_{4c}, 7_{4c}, 8_{4c}, 9_{4c}$, and $10_{4c}$ are formed between two servo areas $4_{4s}$ and $4_{5s}$, the fifth sector areas $6_{5c}, 7_{5c}, 8_{5c}, 9_{5c}$, and $10_{5c}$ are formed between two servo areas $4_{5s}$ and $4_{6s}$, the sixth sector areas $6_{6c}, 7_{6c}, 8_{6c}, 9_{6c}$, and $10_{6c}$ are formed between two servo areas $4_{6s}$ and $4_{7s}$, the seventh sector areas $6_{7c}, 7_{7c}, 8_{7c}, 9_{7c}$, and $10_{7c}$ are formed between two servo areas $4_{7s}$ and $4_{8s}$, and the eighth sector areas $6_{8c}, 7_{8c}, 8_{8c}, 9_{8c}$, and $10_{8c}$ are formed between two servo areas $4_{8s}$ and $4_{1s}$.

In the present embodiment, the size of each sector area 5 to 10, more specifically the size of the data area, of track zones $2_{1T}$ to $2_{6T}$ varies from zone to zone. For example, as shown in FIG. 1B, the size of the sector areas $5_{1c}$ to $5_{8c}$ in the track zone $2_{1T}$ is 256 bytes, the size of the sector areas $6_{1c}$ to $6_{8c}$ in the track zone $2_{2T}$ is 244 bytes, the size of the sector areas $7_{1c}$ to $7_{8c}$ in the track zone $2_{3T}$ is 228 bytes, the size of the sector areas $8_{1c}$ to $8_{8c}$ in the track zone $2_{4T}$ is 192 bytes, the size of the sector areas $9_{1c}$ to $9_{8c}$ in the track zone $2_{5T}$ is 160 bytes, and the size of the sector areas $10_{1c}$ to $10_{8c}$ in the track zone $2_{6T}$ is 128 bytes.

Figure 2:
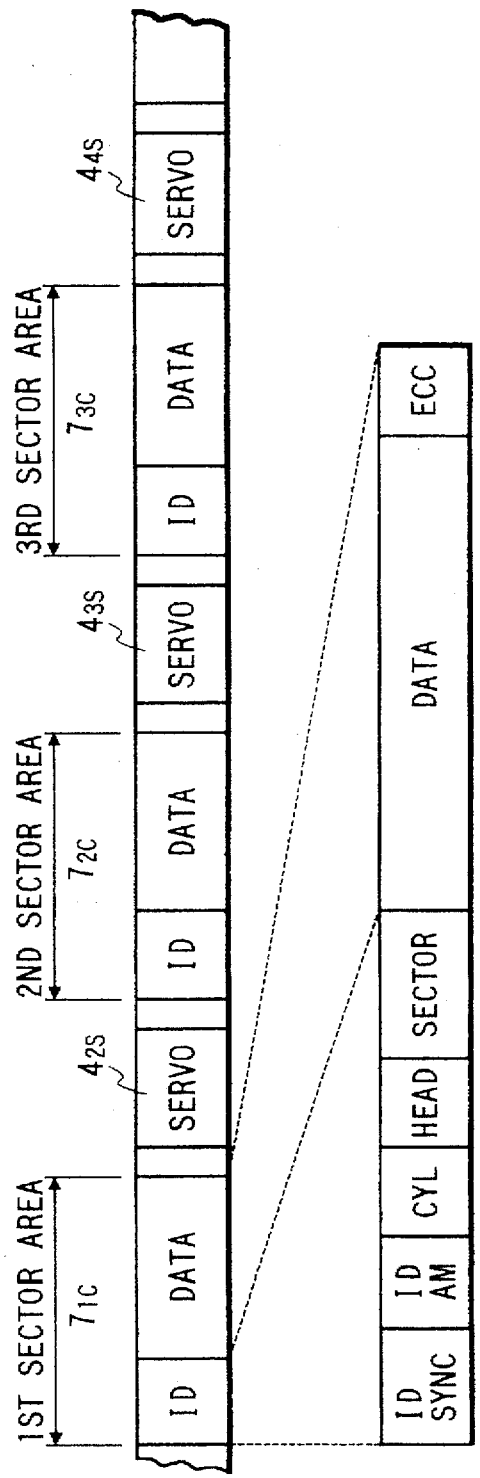
FIG. 2 is a schematic diagram illustrating the detail of a very small portion of a sector area of the formatted disk medium shown in FIGS. 1A and 1B.
Figure 3:
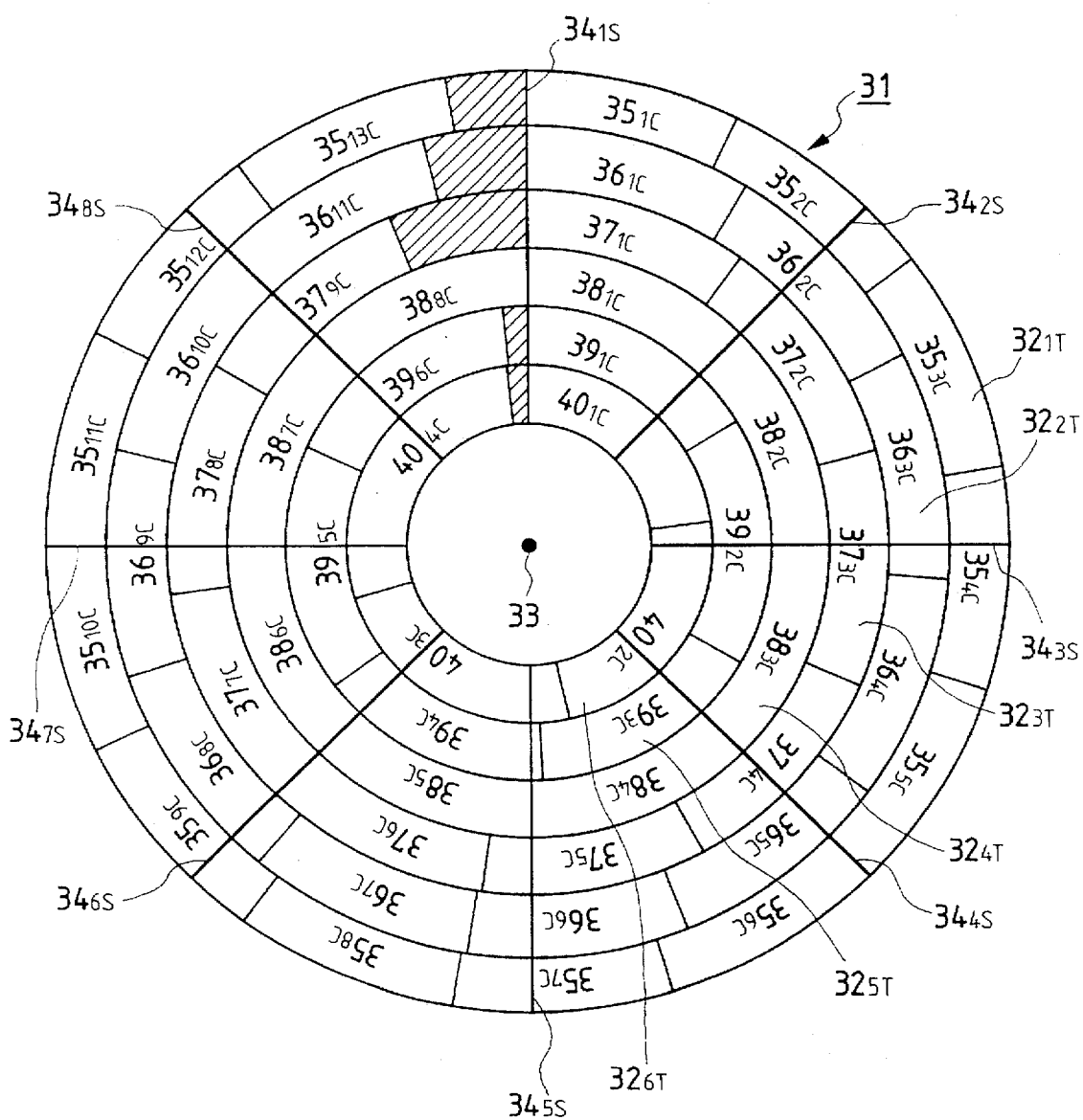
FIG. 3 is a schematic representation of an example of a disk medium formatted according to a known technique, for use in a magnetic disk device.
Figure 4:
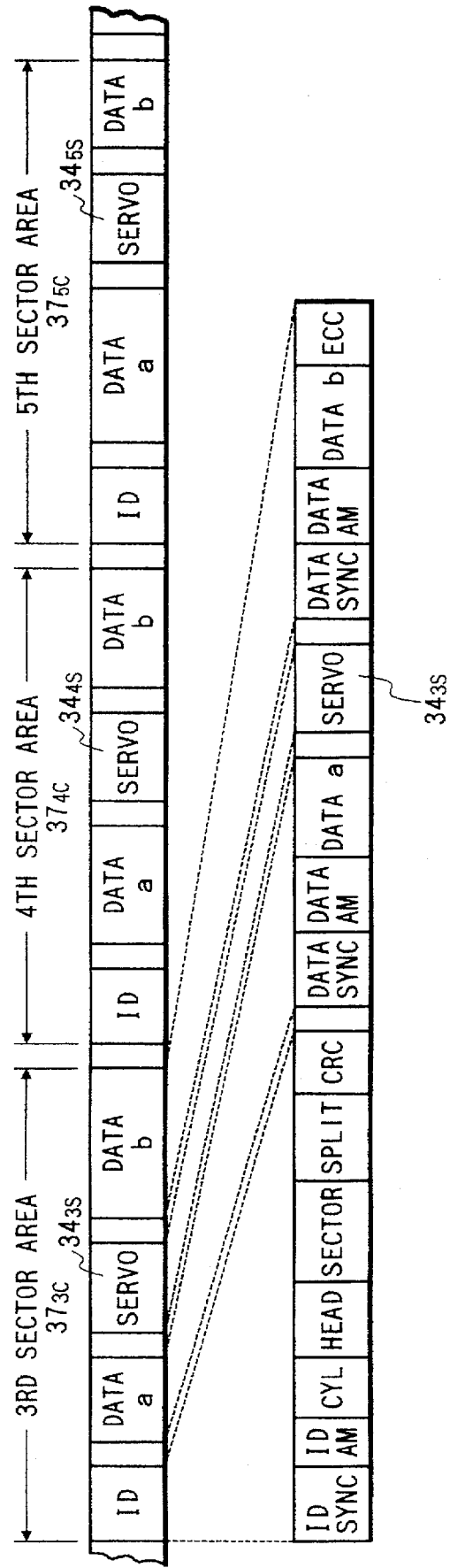
FIG. 4 illustrates the detail of a very small part of a sector area of the disk medium formatted according to the known technique, for use in a conventional magnetic disk device.

FIG. 2 is a schematic diagram illustrating the detail of a very small part of a sector area formatted according to the present embodiment of the invention.

As shown in FIG. 2, in one track zone for example the track zone $2_{3T}$, one sector area for example the first sector area $7_{1c}$ consists of an identification (ID) area and one data area, and the following second sector area $7_{2c}$ consists of an ID area and one data area. Furthermore, the following third sector area $7_{3c}$ consists of an ID area and one data area. Similarly, the other sector areas $7_{4c}$ to $7_{8c}$ of the track zone $2_{3T}$ also consist of an ID area and one data area, and the sector areas $5_{1c}$ to $5_{8c}$, $6_{1c}$ to $6_{8c}$, $8_{1c}$ to $8_{8c}$, $9_{1c}$ to $9_{8c}$, and $10_{1c}$ to $10_{8c}$ of the other track zones $2_{1T}$ to $2_{2T}$, and $2_{4T}$ to $2_{6T}$ are formed in a similar manner.

The details of the structure of one sector area, for example of the first sector area $7_{1c}$, are as follows. That is, as shown in FIG. 2, the ID area includes an ID synchronization part (IDSYNC), an ID address mark part (IDAM), a cylinder information part (Cyl), a head information part (Head), and a sector information part (Sector). The data area includes a data part and an ECC part associated with the cylinder information part, the head information part, and the sector information part. The data area is disposed directly adjacent to the ID area without having any gap area between the ID area and the data area.

In the disk medium 1 formatted in the above-described manner according to the present embodiment, each sector area $5_{1c}$ to $5_{8c}$, $6_{1c}$ to $6_{8c}$, $7_{1c}$ to $7_{8c}$, $8_{1c}$ to $8_{8c}$, $9_{1c}$ to $9_{8c}$, and $10_{1c}$ to $10_{8c}$ is formed in such a manner that the length (in bytes) of the data area and thus the size of each sector area vary depending on the location of the track zone $2_{1T}$ to $2_{6T}$ so that the data area is not split by the servo area and thus no useless area, in which no data is written, is formed in the track zones $2_{1T}$ to $2_{6T}$. This makes it possible to efficiently use each area.

Furthermore, in the disk medium 1 formatted according to the present embodiment, it is possible to remove the gap area between the ID area and the data area. Thus, the data area is not split, and therefore it becomes unnecessary to form a gap area between the data area and the servo area. Furthermore, unlike the ID area and the data area in the conventional technique, it is unnecessary to form a data split information part (Split) in the ID area, and thus it is unnecessary to form a data synchronization part (DataSYNC) and data address mark part (DataAM) in the split data area. As a result, it is possible to expand the ID areas and the data areas and a greater amount of data can be written in these areas. In this technique, since data split information parts (Split), two data synchronization parts (DataSYNC), and data address mark parts (DataAM) are not required, neither hardware nor software for handling the split data is required, and thus the magnetic disk device 1 can control the operation associated with the disk medium 1 using a simple mechanism.

In the present embodiment, the disk medium 1 is formatted in such a manner that there is no gap area between an ID area and a data area in sector areas. Therefore, when data is written into a data area of a certain sector area, if data is written into the data area adjacent to the ID area immediately after reading a data from the ID area of the sector area, it will be very difficult to control the operation of the magnetic disk device.

In the present embodiment, the above problem is avoided by searching for a sector area located immediately before a desired sector into which data is to be written, and then performing a single writing operation for both the ID area and the following data area of the above desired sector.

In this method of writing data onto the disk medium 1, it is possible to write data into a desired data area of the disk medium 1 having no gap between ID areas and data areas, with a simple magnetic disk device using no special difficult technique.

In the above-described embodiment, the disk medium 1 is formatted in such a manner that no gap is formed between ID areas and data areas. However, the present invention is not limited to such a disk medium having no gap between ID areas and data areas. As in the conventional disk medium, the disk medium 1 may also be formatted so that a gap is formed between an ID area and a data area.

In the case where a gap is formed between an ID area and a data area, data may be written into a data area after reading data from the ID area corresponding to the data area into which the data is to be written.

Furthermore, in the above-described embodiment, the disk medium 1 is formatted in such a manner that no CRC is formed in ID areas. However, the present invention is not limited to such the disk medium having no CRC in the ID area. CRCs associated with the cylinder information part (Cyl), the head information part (Head), and the sector information part (Sector) may also be formed in the ID areas.

Furthermore, in the above-described embodiment, the disk medium 1 is formatted so that six track zones $2_{1T}$ to $2_{6T}$ are formed. However, the present invention is not limited to the disk medium 1 formatted in such a manner. The disk medium 1 may have seven or more or otherwise five or less track zones $2_{1T}$ to $2_{nT}$.

Furthermore, in the above embodiment, the disk medium 1 is formatted in such a manner that eight servo areas $4_{1s}$ to $4_{8s}$ are formed. However the present invention is not limited to such a disk medium. The disk medium 1 may also have nine or more or otherwise seven or less servo areas $4_{1s}$ to $4_{ms}$. If the number of the servo areas $4_{1s}$ to $4_{ms}$ is modified to a value other than 8, the numbers of the sector areas $5_{1c}$ to $5_{mc}$, $6_{1c}$ to $6_{mc}$, $8_{1c}$ to $8_{mc}$, $9_{1c}$ to $9_{mc}$, and $10_{1c}$ to $10_{mc}$ should be modified to the corresponding numbers.

What is claimed is:

1. A disk medium formatted to comprise:

a plurality of concentric track zones, each track zone including a plurality of tracks;

a plurality of servo areas formed along lines which are located at intervals of substantially equal angle and which extend from an innermost track located adjacent a center of the disk medium to an outermost track located adjacent an outer periphery of the disk medium;

wherein each of said plurality of tracks includes a plurality of sector areas, each sector area including a single data area;

wherein the number of bytes in the data area of each of said plurality of sector areas varies depending on the track zone's location relative to the center of the disk medium such that a first data area of a first sector area of the outermost track has a greater number of bytes than a second data area of a second sector of the innermost track; and wherein none of the plurality of servo areas is located within said data area of any of said plurality of sector areas.

2. A disk medium according to claim 1, wherein each of said plurality of sector areas comprises an identification (ID) area located between said servo area and said data area;

wherein said ID area of each of said plurality of sector areas comprises a synchronization part, an ID address mark part, a cylinder information part, a head information part, and a sector information part; and wherein said data area of each of said plurality of sector areas comprises a data part and an ECC part associated with said cylinder information part, said head information part, said sector information part, and said data part.

3. A method of writing data onto a disk medium which is formatted to include a plurality of concentric track zones, each track zone including a plurality of tracks;

wherein a plurality of servo areas are aligned along radial lines which are located at intervals of substantially equal angle and which extend from an innermost track located adjacent a center of the disk medium to an outermost track located adjacent an outer periphery of the disk medium;

wherein each of said plurality of tracks includes a plurality of sector areas located between associated pairs of said plurality of servo areas, each sector area including a single, continuous data area;

wherein the number of bytes in the data area of each of said plurality of sector areas varies depending on the track zone's location relative to the center of the disk medium such that a first data area of a first sector area of the outermost track has a greater number of bytes than a second data area of a second sector of the innermost track; and wherein none of the plurality of servo areas is located within any of said data areas;

wherein the method comprises the steps of, during a writing operation to a data area of a first sector area, searching for a second sector area located adjacent the first sector area, and then writing to the data area of the first sector area.

4. A disk medium comprising a plurality of concentric tracks including an innermost track located near a center of the disk, an outermost track located adjacent an outer periphery of the disk, and a plurality of centrally located tracks located between the innermost track and the outermost track, each of the plurality of tracks being formed by a plurality of data storage locations grouped into bytes;

wherein the disk medium is formatted such that the innermost track and the outermost track are divided into an equal number of sector areas, each sector area of the innermost track and the outermost track being located between associated pairs of servo areas and including a single, continuous data area;

wherein the data area of each of the sector areas of the innermost track include a first plurality of bytes;

wherein the data area of each of the sector areas of the outermost track include a second plurality of bytes; and wherein the second plurality is greater than the first plurality.

5. A disk medium according to claim 4, wherein each of said sector areas comprises an identification (ID) area located between said servo area and said data area;

wherein said ID area of each sector area comprises a synchronization part, an ID address mark part, a cylinder information part, a head information part, and a sector information part; and wherein said data area of each sector area comprises a data part and an ECC part associated with said cylinder information part, said head information part, said sector information part, and said data part.

* * * * *